(12) United States Patent
Courouve et al.

(10) Patent No.: US 9,692,626 B2
(45) Date of Patent: Jun. 27, 2017

(54) VERY HIGH BIT RATE RFID RECEIVER

(71) Applicant: Commissariat A L'Energie Atomique et aux Energies Alternatives, Paris (FR)

(72) Inventors: Pierre Courouve, Domene (FR); Jean-Baptiste Dore, Saint Martin le Vinoux (FR); Manuel Pezzin, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/204,186

(22) Filed: Jul. 7, 2016

(65) Prior Publication Data

US 2017/0012808 A1   Jan. 12, 2017

(30) Foreign Application Priority Data

Jul. 9, 2015 (FR) ...................... 15 56536

(51) Int. Cl.
| | | |
|---|---|---|
| H04L 27/22 | (2006.01) | |
| H04L 27/227 | (2006.01) | |
| H04B 5/00 | (2006.01) | |

(52) U.S. Cl.
CPC ....... H04L 27/2272 (2013.01); H04B 5/0062 (2013.01); H04L 27/2278 (2013.01)

(58) Field of Classification Search
CPC . H04L 27/22; H04L 27/2272; H04L 27/2278; H04B 5/0062
See application file for complete search history.

(56) References Cited

U.S. PATENT DOCUMENTS

| | | |
|---|---|---|
| 5,504,455 A | 4/1996 | Inkol |
| 2007/0071036 A1 | 3/2007 | Okunev et al. |
| 2008/0197982 A1* | 8/2008 | Sadr .................. H03M 13/2957 340/10.4 |

OTHER PUBLICATIONS

French Preliminary Search Report issued Mar. 4, 2016 in French Application 15 56536, filed on Jul. 9, 2015 ( with English translation of Categories of Cited Documents).
David Seebacher et al "Measurement Instrument Selection for Very High Bit Rate Contactless Transponder Evaluation", 2011 IEEE International Conference on RFID Technologies and Applications, 2011, 8 pages.
Yuan Liu et al "Digital Correlation Demodulator Design for RFID Reader Receiver", IEEE Wireless Communications and Networking Conference, 2007, 5 pages.

(Continued)

*Primary Examiner* — Jaison Joseph
(74) *Attorney, Agent, or Firm* — Oblon, McClelland, Maier & Neustadt, L.L.P.

(57) ABSTRACT

A RFID VHBR receiver including a quadrature digital demodulator, a symbol synchronization module at the baud rate and a PSK demodulator. The symbol synchronization module receives the in-phase and quadrature samples from the demodulator and extracts the components of the PSK symbols at the baud rate by selecting a decimation point in time. This synchronization is made by taking advantage of the particular structure of the preamble of the transmission frame in a RFID VHBR receiver.

12 Claims, 7 Drawing Sheets

(56) References Cited

OTHER PUBLICATIONS

Christoph Angerer et al "Advanced Synchronisation and Decoding in RFID Reader Receivers", Radio and Wireless Symposium, 2009, 4 pages.
"ISO/IEC JTC 1/SC 17 Cards and Person identification", N 4254, ISO IEC, 2011, 21 pages.
R.C.H Van De Beek et al "A 13.56Mbps PSK Receiver for 13.56MHz RFID Applications", 2012 IEEE Radio Frequency Integrated Circuits Symposium, 2012, 4 pages.
M. Gossar et al "Parameter Analysis and Reader Architectures for Broadband 13.56 MHz RFID Systems", IMS 2010, IEEE 2010, 4 pages.
"Identification Cards—Contactless integrated circuits cards—Proximity Cards, Part 2: Radio frequency power and signal interface", ISO/IEC, 14443-2:2010, 20 pages.

\* cited by examiner

VERY HIGH BIT RATE RFID RECEIVER

TECHNICAL FIELD

The present invention generally relates to the field of RFID (Radio Frequency Identification) receivers and more particularly Very High Bit Rate (VHBR) RFID receivers.

STATE OF PRIOR ART

The first generation of RFID systems has been standardized in ISO/IEC 14442-Part 2 standard. The standard in question allows for a transmission using a carrier frequency f of 13.56 MHz with two modulation types: a first so-called type A modulation corresponding to an amplitude modulation or ASK (Amplitude Shift Keying) having a 100% modulation depth and a Manchester coding and a second so-called type B modulation corresponding to a modulation with non-return to zero (NRZ) having a 10% modulation depth. Both modulation types are allowed for bit rates ranging up to 846 kbit/s.

However, new applications of the RFID systems in particular in the field of identification (electronic passport for example) require higher bit rates. To achieve higher bit rates while respecting the spectral mask set by the standard, it has been provided to resort to a phase modulation or PSK (Phase Shift Keying) and to reduce the symbol duration. The phase modulation orders currently contemplated range from 2 to 16 (2-PSK, 4-PSK, 8-PSK, 16-PSK). The symbol duration $T_s$ currently provided in the RFID VHBR system is 2T or 4T where T=1/f is the period of the abovementioned carrier. In other words, the modulation rate is 6.78 Mbaud or 3.39 Mbaud. It is understood that with a modulation rate of 6.78 Mbaud and a modulation 16-PSK, bit rates of 27.12 Mbit/s can now be reached. Another mode provides for the use of an ASK (Amplitude-Shift Keying) modulation with a modulation rate ranging up to 6.78 Mbaud that enables a bit rate of 6.78 Mbit/s to be reached.

However, if the receivers of the first generation RFID systems, that is having a low bit rate, had a particularly simple architecture, the ones with a very high bit rate have to resort to a relatively complex signal processing to counteract inter-symbol interference. This inter-symbol interference is due to the bandpass nature of the coupling between the reader and the RFID system card, it cannot be neglected at a high bit rate any longer.

Equalization techniques which are the more simple to implement operate on a sampled version of the complex signal (by comparison with the non-linear ones operating on the sampled phase information) and consequently resort to a quadrature demodulation (also called I/Q demodulation) requiring generally analogue mixers. But, these mixers are hardly compatible with the architecture of RFID receivers given that the latter are powered only by the energy of the carrier.

The paper by R. C. H. van de Beek and al. entitled "A 13.56 Mbps PSK receiver for 13.56 MHz RFID applications" published in Proc. of IEEE Radio Frequency Integrated Circuits Symposium (RFIC), pp. 239-242, 17-19 Jun. 2012, describes a RFID receiver comprising a phase demodulation in the analogue field based on the time measurement separating zero crossings of the RF signal received from the zero crossings of the signal of the carrier recovered. This architecture is complex and the demodulation result is relatively sensitive to noise.

The paper by M. Gossar and al. entitled "Parameter analysis and reader architectures for broadband 13.56 MHz RFID systems" published in Microwave Symposium Digest (MTT), IEEE MTT-S Int'l, pp. 1524-1527, 23-28 May 2010, describes a RFID receiver having a SDR (Software Defined Radio) architecture and using an analogue/digital (ADC) converter in RF band to make a direct quadrature demodulation in the digital field. Such a quadrature digital demodulator is described for example in document U.S. Pat. No. 5,504,455.

Regardless of the quadrature demodulation type contemplated, it is then necessary to synchronize the receiver on the transmitted symbols. Indeed, in the abovementioned RFID VHBR system, the symbols are transmitted by PSK modulation on a symbol duration $T_s$ than can be 2T or 4T, also called ETU (Elementary Time Unit). In other words, the baud rate is $R_s=f/4(f/2)$ and the ETU is of a duration 4T (2T). It is reminded that the baud rate is the rate at which the modulation symbols are transmitted.

If the RFID receiver knows the baud rate of the transmitter, on the other hand, he does not know when a symbol begins in the sequence of complex samples from the demodulator.

The object of the present invention is consequently to provide a very high bit rate RFID receiver capable of being synchronized in a simple and efficient manner on the received symbols.

DISCLOSURE OF THE INVENTION

The present invention is defined by a RFID receiver for receiving a signal comprising transmission frames, each frame consisting of PSK symbols and beginning with a sequence of a,a,a*,a*,a,a, . . . type pilot symbols, the signal being modulated at a carrier frequency f=1/T, the receiver comprising a quadrature digital demodulator for providing, at a sampling frequency, in-phase samples and quadrature samples to a symbol synchronization module, a PSK demodulator for demodulating PSK symbols provided by the symbol synchronization module, said receiver further comprising:

a first demultiplexer receiving a sequence formed by the consecutive quadrature samples for providing four interleaved subsequences of these samples;

a sign detector receiving the samples of one of these subsequences and providing a sign signal;

a sign correlator for correlating the sign signal thus obtained with a signed sequence having a predetermined length;

correlation means for correlating the different subsequences with said signed sequence respectively;

a first decision module activated when the correlation result of the sign correlator exceeds a predetermined threshold, the decision module determining, when activated, the subsequence providing the highest correlation result and deducing a decimation point in time therefrom;

at least one first and one second decimator receiving respectively, at the sampling frequency, the in-phase and quadrature samples of the quadrature digital demodulator, and decimating them at said decimation point in time for providing in-phase and quadrature components of the modulation symbols at the baud rate.

The first demultiplexer can be made for example by means of a series/parallel converter forming words of four successive samples, one of the outputs of said converter being connected to the sign correlator.

According to an advantageous embodiment, the sign detector provides a value equal to −1 when an input sample is lower than a predetermined negative threshold value, a value equal to +1 when the input sample is higher than a predetermined positive threshold value, and a zero value when the input sample is between said negative threshold value and said positive threshold value.

Advantageously, the RFID receiver generates a square logic signal ($g^+(t)$) at the frequency 2f and a second square logic signal ($\bar{g}^+(t)$) being the inverse of the first one, the quadrature digital demodulator comprising:

a first integrator for integrating a first component of the received signal ($y(t),y^+(t)$) when the first logic signal is in a high state and providing a first integration result when the first logic signal is in a low state;

a second integrator for integrating said component of the received signal ($y(t),y^+(t)$) when the second logic signal is in a high state and providing a second integration result when the second logic signal is in a low state;

a first subtractor for subtracting the second integration result from the first integration result for providing samples $z_n$ at the frequency 4f;

a first combining module for combining successive samples $z_n$, $z_{n-1}$, $z_{n-2}$, $z_{n-3}$, and providing the samples $I_n = z_n - z_{n-1} - z_{n-2} + z_{n-3}$ at the frequency 4f;

a second combining module for combining successive samples $z_n$, $z_{n-1}$, $z_{n-2}$, $z_{n-3}$ and providing samples $Q_n = -z_n - z_{n-1} + z_{n-2} + z_{n-3}$ at the frequency 4f;

a third decimator for decimating the samples $I_n$ with a decimation factor 4 for providing in-phase component samples $I(kT)$;

a fourth decimator for decimating the samples $Q_n$ with a decimation factor 4 for providing quadrature component samples $Q(kT)$.

According to a first alternative, said first component of the received signal is the received signal itself.

According to a second alternative, the first component ($y^+(t)$) corresponds to the positive part of the received signal, a second component ($y^-(t)$) corresponds to the negative part of the received signal, the received signal being a combination of the first component and the second component, and in that the quadrature digital demodulator further comprises:

a third integrator for integrating the second component of the received signal when the first logic signal is in a high state and providing a third integration result when the first logic signal is in a low state;

a fourth integrator for integrating the second component of the received signal when the second logic signal is in the high state and providing a fourth integration result when the second logic signal is in the low state;

a second subtractor for subtracting the fourth integration result from the third integration result, the samples $z_n$ being obtained as a combination of the results of the first and second subtractors.

The quadrature digital demodulator can comprise a first analogue-digital converter for converting the first and second integration results before the subtraction by the first subtractor.

Alternatively, it can comprise a first analogue/digital converter for converting the first and second integration results before the subtraction by the first subtractor as well as a second analogue/digital converter for converting the third and fourth integration results before the subtraction by the second subtractor.

In both previous cases, the quadrature digital demodulator can further comprise a second demultiplexer receiving the samples $I_n$ and demultiplexing them to four outputs, a third demultiplexer receiving the samples $Q_n$ and demultiplexing them to four outputs, the quadrature digital demodulator further comprising a second decision module receiving at least one sample from an output of the demultiplexer and at least one sample of a corresponding output of the third demultiplexer, said second decision module deciding, for a time interval when said carrier is not modulated, the decimation point in time in the third and fourth decimators.

According to a first exemplary implementation, the second decision module receives two consecutive samples $I_n, I_{n-1}$ of two neighbouring outputs of the second demultiplexer and two consecutive samples $Q_n, Q_{n-1}$ of two neighbouring outputs of the third demultiplexer, the second decision module deciding the decimation point in time in the third and fourth decimators by comparing in absolute value $I_n$ and $I_{n-1}$ with a predetermined threshold and if the sample $I_n$, resp. $I_{n-1}$, is lower than this threshold by determining the sign of the corresponding sample $Q_n$, resp. $Q_{n-1}$.

According to a second exemplary implementation, the second decision module receives two consecutive samples $I_n, I_{n-1}$ from two neighbouring outputs of the second demultiplexer and two consecutive samples $Q_n, Q_{n-1}$ from two neighbouring outputs of the third demultiplexer, the second decision module deciding the decimation point in time by comparing in absolute value $Q$ and $Q_{n-1}$ with a predetermined threshold and if the sample $Q_n$, resp. $Q_{n-1}$ is lower than this threshold, by determining the sign of the corresponding sample $I_n$, resp. $I_{n-1}$.

Finally, the samples of each of both neighbouring outputs of the second and third demultiplexers can be filtered by low-pass filters before being provided to the second decision module.

BRIEF DESCRIPTION OF THE DRAWINGS

Further characteristics and advantages of the invention will appear upon reading a preferential embodiment of the invention in reference to the appended figures in which.

DETAILED DISCLOSURE OF PARTICULAR EMBODIMENTS

Figure 1:
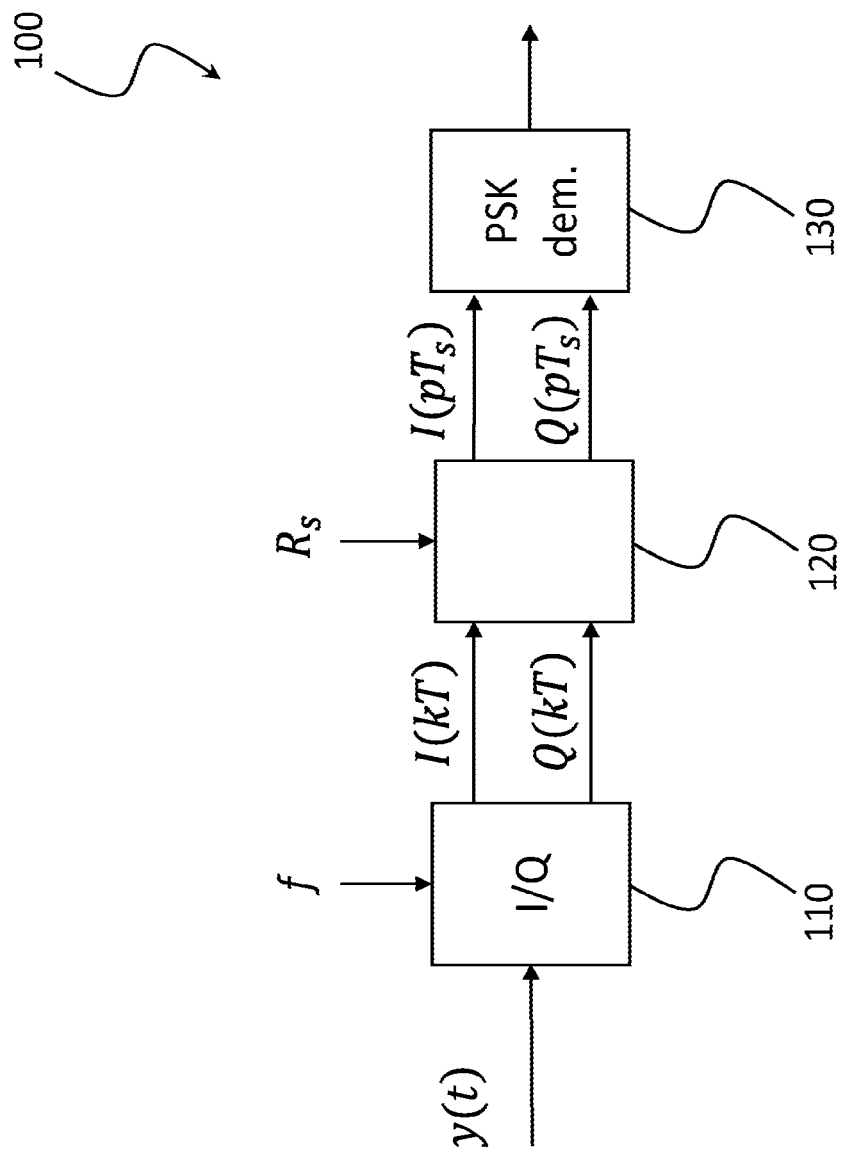
FIG. 1 schematically represents the general architecture of a RFID VHBR receiver according to one embodiment of the invention.

FIG. 1 represents the general architecture of a RFID VHBR receiver according to one embodiment of the invention.

The receiver 100 comprises a quadrature digital demodulator 110, followed by a synchronization module at the baud rate 120, and a PSK demodulator 130.

The quadrature digital demodulator can for example be of the type described in document U.S. Pat. No. 5,504,455, in other words comprising a sampler at the frequency $f_e = 4f$ with multiplexing samples of even and odd ranks on the channels I and Q, and decimators with a factor 4 on each channel.

Preferably, however, the quadrature digital demodulator will have the structure described later in connection with FIGS. 3 and 4.

The symbol synchronization module at the baud rate 120 enables the receiver to extract successive modulation symbols from the sequence of samples provided by the quadrature digital demodulator.

The PSK demodulator 130 then enables a Q-area symbol demodulation to be performed in a known manner per se (where $2^Q$ is the cardinal of the alphabet PSK).

The symbol synchronization module uses the particular structure of the transmission frame in a RFID VHBR system. Indeed, in such a system, each frame is preceded by a preamble of 140 symbols. From these 140 symbols, the first 44 ones have alternate Q components at the frequency $R_s/2$ where $R_s$ is the baud rate. More precisely, these first 44 symbols form a series: a,a,a*,a*,a,a,a*,a*, . . . where a and a* are conjugate symbols belonging to the modulation constellation.

A detailed description of the structure of the preamble of the transmission frame will be found in the ISO/IEC 14443-2:2010 standard project entitled "Identification cards—contactless integrated circuit cards—proximity cards, Part 2: Radio frequency power and signal interface" available on the site www.iso.org.

Figure 2:
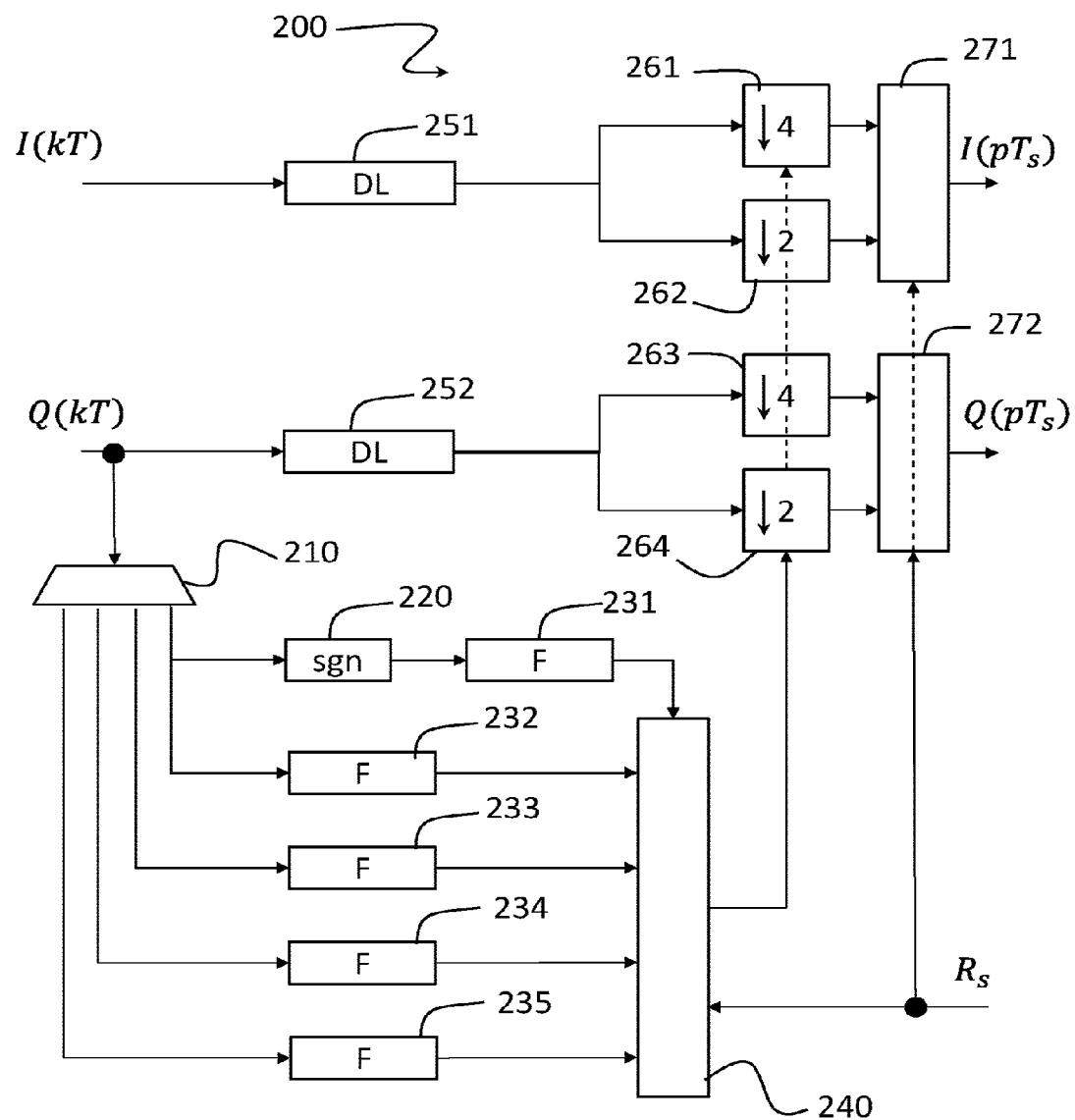
FIG. 2 schematically represents a synchronization module at the baud rate of the receiver of FIG. 1.

FIG. 2 schematically shows a symbol synchronization module at the baud rate, 200.

This module receives as an input, at the rate f, the samples I(kT) and Q(kT), from the quadrature demodulator.

As previously indicated, the baud synchronization takes advantage of the alternate sign of the component Q for the first preamble symbols, that is +1,+1, −1, −1,+1,+1, . . . .

The sequence of the successive samples Q(kT) is divided by a demultiplexer (1 to 4), 210, into four interleaved subsequences respectively formed by the samples having indices such that k=0[4], k=1[4], k=2[4], k=3[4] where [ ] designates the modulo, each of these subsequences being correlated by correlation means 232-235 with the semi-alternate series +1,+1,−1,−1,+1,+1, . . . . The subsequence corresponding to the correlation maximum enables the decimation of the samples I(kT) and Q(kT) to be timed to obtain the real and imaginary parts of the successive symbols.

The demultiplexer 210 can be made for example in the form of a series/parallel converter. When $R_s=f/4$, the words output from the demultiplexer represent the duration of a symbol and when $R_s=f/2$, the words output from the demultiplexer represent the duration of two consecutive symbols.

Any of the outputs from the demultiplexer (herein the first output) is connected to a sign detector 220. The sign detector can be implemented in a conventional way by means of a comparison with a zero value, the output of the sign detector being then in a binary form (−1 for a negative sign and +1 for a positive sign). Advantageously, the sign detector uses a double threshold, the output of the detector being ternary. More precisely, the sign detection function σ is, in this case, defined by:

$$\sigma(x)=-1 \text{ if } x<-Th \quad (1\text{-}1)$$

$$\sigma(x)=0 \text{ if } -Th \leq x \leq Th \quad (1\text{-}2)$$

$$\sigma(x)=+1 \text{ if } x>Th \quad (1\text{-}3)$$

where Th is a positive threshold value which is chosen depending on the signal to noise ratio output from the quadrature demodulator.

The (binary or ternary) sign signal thus obtained is correlated in a correlation filter 631, called sign correlator, with the semi-alternate sequence +1,+1,−1,−1,+1,+1, . . . with a predetermined length L (in practice, this length could be chosen equal to 32), at the frequency f/4 or f/2 depending on the case. When the correlation result exceeds a predetermined threshold (for example $$\frac{L-1}{2}),$$

the beginning of the preamble is detected and the decision module 240 is activated.

This decision module receives from the correlation means 232-235, the correlation results of the subsequences with the aforementioned semi-alternate sequence. The correlation means can be correlation filters 232, 233, 234, 235 arranged in parallel on the outputs of the demultiplexer. These filters have an identical structure to that of the sign correlator 231. The decision module compares the correlation results and deduces therefrom the alignment of the samples I(kT) and Q(kT) with respect to the symbols (or to the ETUs).

The samples I(kT) and Q(kT) are on the other hand respectively delayed in the delay lines 251 and 252 to compensate for the processing time in the demultiplexer, the correlation filters and the decision module. The decision module enables the sampling to be timed (at the baud frequency) of the decimators 261 (or 262) on the channel I and 263 (or 264) on the channel Q. The multiplexers 271 and 272 enable the output of the decimator to be chosen as a function of the baud rate. However, it will be noted that the multiplexers 271 and 272 are optional, and the selection of the decimation rate as a function of the baud rate can simply be made by blocking the clock signal of the decimator which is not selected.

Those skilled in the art will understand that the demultiplexer, the correlation means and the decision module could be implemented according to different alternatives without departing from the scope of the present invention. In particular, some calculations made in parallel by a plurality of correlation filters could be made in series or within a single correlation filter operating at a higher frequency, the choice of the implementation depending on a compromise between the circuit silicon area and its operating speed.

The output samples are the components $I(pT_s)$ and $Q(pT_s)$ of the successive symbols, p representing the index of the symbols in question.

The symbols thus obtained are then provided to the PSK demodulator.

An advantageous embodiment of the quadrature digital demodulator will be described hereinafter.

First, the baseband demodulation principle by sinusoidal functions is reminded. If the signal to be demodulated is referred to as y(t), the conventional baseband demodulator performs a multiplication by quadrature sinusoidal functions at the frequency f of the carrier, and then a sampling of the I and Q channels at the same frequency. In other words, such a conventional demodulator provides baseband samples defined by:

$$I(kT) = \int_{kT}^{(k+1)T} y(t) \cos(2\pi ft) dt \quad (2\text{-}1)$$

$$Q(kT) = \int_{kT}^{(k+1)T} y(t) \sin(2\pi ft)dt \qquad (2\text{-}2)$$

where $T=1/f$. The signal to be demodulated is expressed in the following form:

$$y(t)=A(t)\cos(2\pi ft+P(t)) \qquad (3)$$

where $A(t)$ is a signal modulating the amplitude and $P(t)$ is a signal modulating the phase. Since the modulation is very slow with respect to the period of the carrier, $A(t)$ and $P(t)$ can be considered as been constant on a duration T. The samples on the channels I and Q have consequently the following simplified form:

$$I(kT)=A(kT)\cos(P(kT)) \qquad (4\text{-}1)$$

$$Q(kT)=A(kT)\sin(P(kT)) \qquad (4\text{-}2)$$

Figure 5:
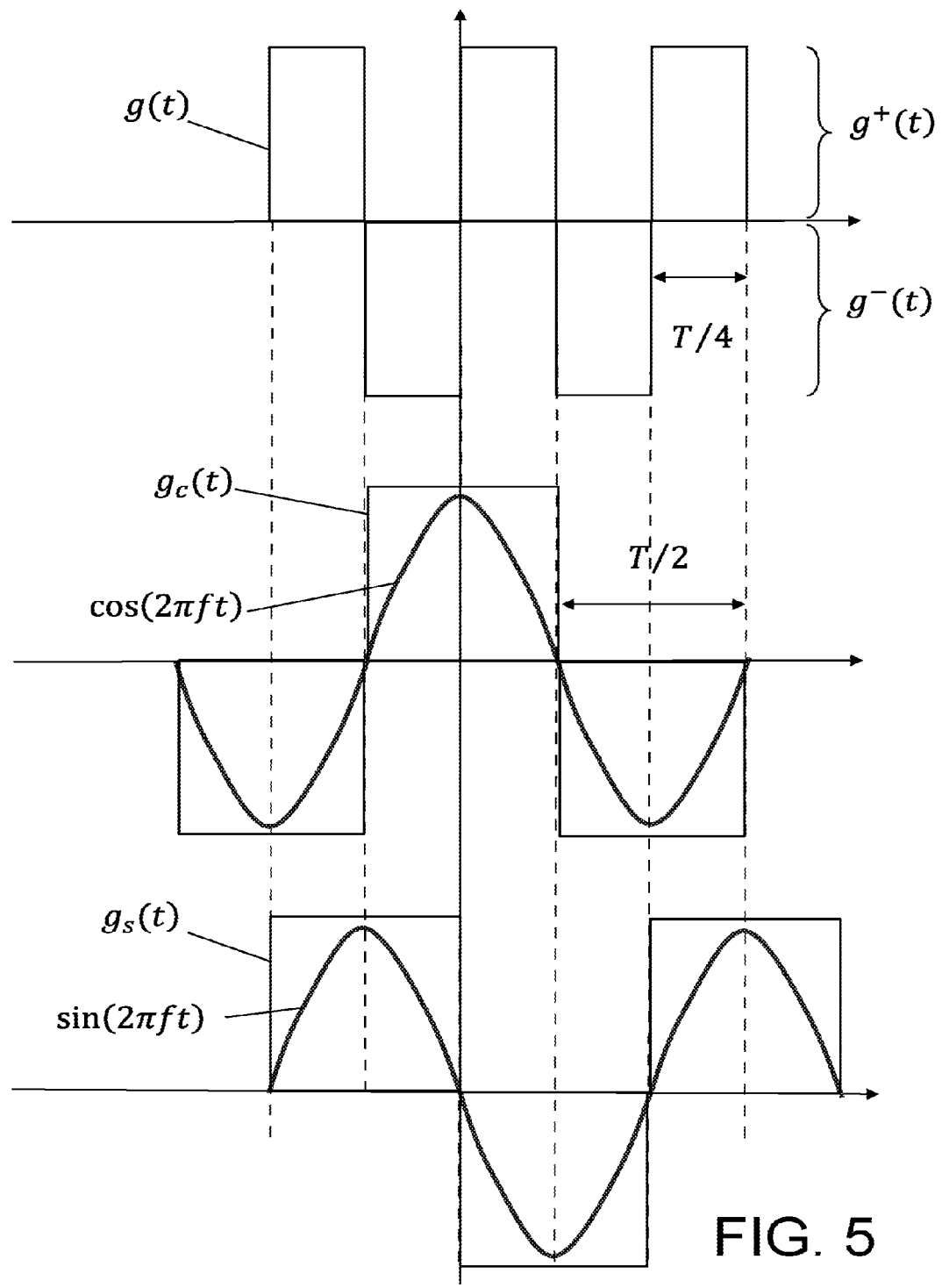
FIG. 5 represents useful functions for the quadrature demodulators of FIG. 3 or 4.

The quadrature digital demodulator provided herein uses a demodulation base formed by two quadrature window functions, $g_c(t)$ and $g_s(t)$, having a period T, respectively approximating the functions $\cos(2\pi ft)$ and $\sin(2\pi ft)$. More precisely:

$$g_c(t) = \Pi\left(\frac{t}{T/2}\right) \otimes \sum_k (-1)^k \delta(t - kT/2) \qquad (5\text{-}1)$$

$$g_s(t) = g_c(t - T/4) \qquad (5\text{-}2)$$

where $$\Pi\left(\frac{t}{T/2}\right)$$

is the gate function with a width T/2, centred on 0, taking the value 1 in this interval and the zero value anywhere else and $$\sum_k (-1)^k \delta(t - kT/2)$$

is the alternate comb function with a period T, $\delta(.)$ being the Dirac distribution. Functions $g_c(t)$ and $g_s(t)$ as well as functions $\cos(2\pi ft)$ and $\sin(2\pi ft)$ are represented in FIG. 5.

The decomposition according to this base gives:

$$I(kT) = \int_{kT}^{(k+1)T} y(t)g_c(t)dt \qquad (6\text{-}1)$$

$$Q(kT) = \int_{kT}^{(k+1)T} y(t)g_s(t)dt \qquad (6\text{-}2)$$

Functions $g_c(t)$ and $g_s(t)$ can be decomposed into Fourier series, for example:

$$g_s(t) = \sum_{p=1}^{\infty} \frac{1}{2p-1} \sin(2\pi f(2p-1)t) \qquad (7)$$

As a result, there is:

$$Q(kT) = \int_{kT}^{(k+1)T} y(t) \sum_{p=1}^{\infty} \frac{1}{2p-1} \sin(2\pi f(2p-1)t)dt \qquad (8)$$

that is, with the same hypothesis with a low modulation variation $A(t)$ and $P(t)$ on a symbol time:

$$Q(kT) = \frac{1}{2}A(kT) \sin(P(kT)) + \sum_{p=2}^{\infty} \frac{1}{2p-1} \qquad (9)$$

$$\int_{kT}^{(k+1)T} \frac{1}{2}(A(t) \sin(4p\pi ft + P(t)) + \sin(4(p-1)\pi ft - P(t))dt$$

The first term of expression (9) corresponds to the fundamental frequency $f=1/T$ of the square signal and the following terms to the harmonics with the frequencies $pf$. Assuming again a low modulation rate as previously, all these terms represent integrals of sinusoidal functions with the frequencies $pf$ on a period T and are thus zero.

A similar calculation can be performed for $g_c(t)$. Finally, as a result, there is:

$$I(kT) = \frac{1}{2}A(kT) \cos(P(kT)) \qquad (10\text{-}1)$$

$$Q(kT) = \frac{1}{2}A(kT) \sin(P(kT)) \qquad (10\text{-}2)$$

Both functions $g_c(t)$ and $g_s(t)$ can be generated from a window function $g(t)$ with a period T/2 defined by:

$$g(t) = \Pi\left(\frac{t - T/8}{T/4}\right) \otimes \sum_k (-1)^k \delta(t - kT/4) \qquad (11)$$

where $$\Pi\left(\frac{t}{T/4}\right)$$

is the gate function taking the value 1 on the support $$\left[0, \frac{T}{4}\right]$$

and zero anywhere else and $$\sum_k (-1)^k \delta(t - kT/4)$$

is the alternate comb function with a period T/2. Function g(t) is also represented in FIG. 5.

Function $g_c(t)$ can be obtained in the following way:

$g_c(t)=+g(t)$ for $t \in [kT, kT+T/4[$ $g_c(t)=-g(t)$ for $t \in [kT+T/4, kT+T/2[$ $g_c(t)=-g(t)$ for $t \in [kT+T/2, kT+3T/4[$ $g_c(t)=+g(t)$ for $t \in [kT+3T/4, (k+1)T[$ (12)

Likewise, function $g_s(t)$ can be obtained in the similar way by:

$g_s(t)=-g(t)$ for $t \in [kT, kT+T/4[$ $g_s(t)=-g(t)$ for $\in [kT+T/4, kT+T/2[$ $g_s(t)=+g(t)$ for $\in [kT+T/2, kT+3T/4[$ $g_s(t)=-g(t)$ for $t \in [kT+3T/4, (k+1)T[$ (13)

If the logic signal corresponding to the positive part of g(t) is referred to as $$g^+(t) = \Pi\left(\frac{t-T/8}{T/4}\right) \otimes \sum_k \delta(t - kT/2)$$

and the logic signal corresponding to the negative part of g(t) is referred to as $$g^-(t) = \Pi\left(\frac{t+T/8}{T/4}\right) \otimes \sum_k \delta(t - kT/2),$$

there is:

$g(t)=g^+(t)-g^-(t)=g^+(t)-\overline{g}^+(t)$ (14)

where $\overline{g}^+(t)$ designates the logic inverse of $g^+(t)$.

The product $w(t)=y(t)g(t)=y(t)g^+(t)-y(t)\overline{g}^+(t)$ can thus be obtained from simple switching (by logic signals) and subtraction operations. The samples on the channels I and Q are then deduced by:

$I(kT) =$ (15-1)

$$\int_{kT}^{kT+T/4} w(t)dt - \int_{kT+T/4}^{kT+T/2} w(t)dt - \int_{kT+T/2}^{kT+3T/4} w(t)dt + \int_{kT+3T/4}^{(k+1)T} w(t)dt$$

$Q(kT) =$ (15-2)

$$-\int_{kT}^{kT+T/4} w(t)dt - \int_{kT+T/4}^{kT+T/2} w(t)dt + \int_{kT+T/2}^{kT+3T/4} w(t)dt + \int_{kT+3T/4}^{(k+1)T} w(t)dt$$

Equations (15-1) and (15-2) show that the in-phase and quadrature samples can be simply obtained from the integration results of the product w(t) on four consecutive period quarters.

More generally, the in-phase and quadrature samples can be obtained from integration results of a signal $w_a(t)=g_a(t) y(t)$ where $g_a(t)$ is a window function with a period $$T_a = \frac{T}{2a}$$

where a is a non-zero integer, the integration being performed on 4a successive time windows with a width $$\frac{T}{4a}.$$

However, it can be shown that we can always return to the case a=1 by gathering these integration results as groups of a successive terms, only the granularity of the time division into windows with the width T/4 being important. Thus, it will be supposed in the following, without making a generalisation, that a=1.

Figure 3:
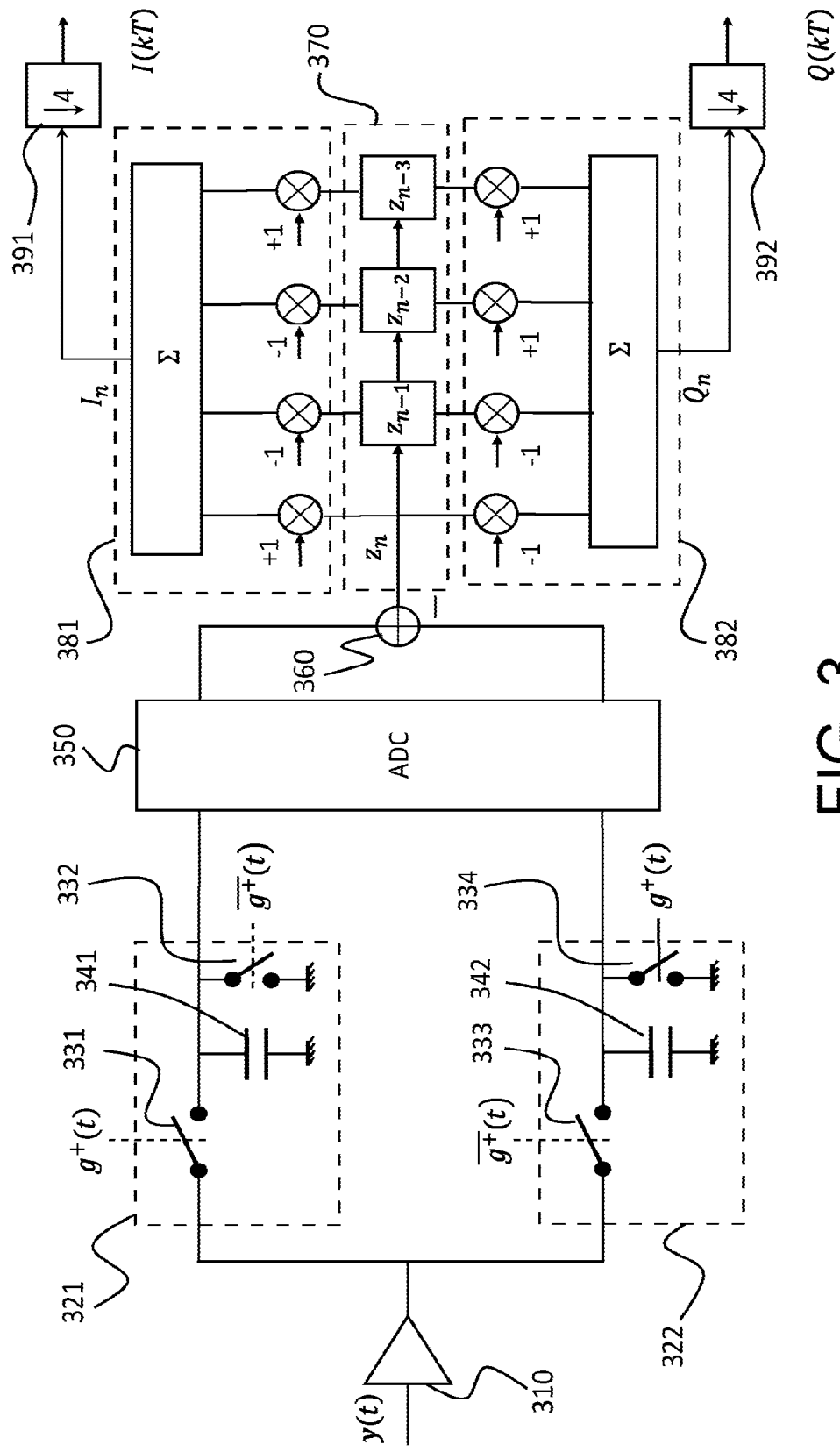
FIG. 3 schematically represents a first alternative of the quadrature demodulator for the receiver of FIG. 1.

FIG. 3 represents a first alternative of a quadrature digital demodulator that can be used in the receiver of FIG. 1.

The RF received signal y(t) is amplified by an amplifier 310 and then integrated by a first integrator 321 and a second integrator 322 arranged in parallel. For example, the signal y(t) could be a voltage signal and the amplifier 310 a transconductance amplifier to convert this voltage signal into a current signal, integrated in parallel by the integrators 321 and 322.

The first integrator comprises a first switch 331 controlled by the logic signal $g^+(t)$ and a second switch 332 controlled by the inverse logic signal $\overline{g}^+(t)$. When the first switch 331 is closed, the second switch 332 is open and the signal y(t) is integrated in the capacitor 341. Reversely, when the first switch is open, the integration result is read and then the second switch is closed to discharge the capacitor 341 (it will be understood that strictly speaking, the control signal of the second switch will have a high level for a fraction of $\overline{g}^+(t)$ so as to allow a reading before resetting).

In a similar way, the second integrator comprises a third switch 333 controlled by the logic signal $\overline{g}^+(t)$ and a fourth switch 334 controlled by the logic signal $g^+(t)$. When the third switch 333 is closed, the fourth switch 334 is open and the signal y(t) is integrated in the capacitor 342. When the third switch 333 is open, the integrated signal is read and then the fourth switch is closed to discharge the capacitor 342.

It is understood that the integrators 321 and 322 operate alternately: when the first one integrates the received signal, the integration result of the second one is read and then reset and, reversely, when the second one integrates the received signal, the integration result of the first one is read and then reset.

By reading the first one or the integration result, it is meant herein the conversion of these results by an analogue-digital converter 350 operating at the frequency 4f (or alternatively, by two analogue digital converters operating on each of the channels).

The integration result of the second integrator is subtracted from the integration result of the first integrator in a first summer 360 (the sign of an input of the summer being inversed). Thus, at a sampling point in time $$t_n = n\frac{T}{4},$$

the value output from the subtractor is equal to:

$$z_n = \int_{(n-1)\frac{T}{4}}^{n\frac{T}{4}} w(t)dt \tag{16}$$

The successive values $z_n$ are stored in a buffer memory (FIFO register), 370. More precisely, at the point in time $t_n$ the FIFO register contains the previous values $z_{n-1}, z_{n-2}, z_{n-3}$. A first combining module 381 performs the combination:

$$I_n = z_n - z_{n-1} - z_{n-2} + z_{n-3} \tag{17-1}$$

and a second combining module 382 performs the combination:

$$Q_n = -z_n - z_{n-1} + z_{n-2} + z_{n-3} \tag{17-2}$$

The outputs of the first and second combining modules are decimated by a factor 4 respectively in the decimators 391 and 392 to give:

$$I(kT) = I_{4n} \tag{18-1}$$

$$Q(kT) = Q_{4n} \tag{18-2}$$

It is understood that the quadrature digital demodulator described above thus enables the samples of the channels I and Q to be obtained in a very simple and robust way, without resorting to analogue mixers. Furthermore, the received signal is steadily integrated, alternately by the first integrator and the second integrator, such that the sampling result is poorly sensitive to noise.

Figure 4:
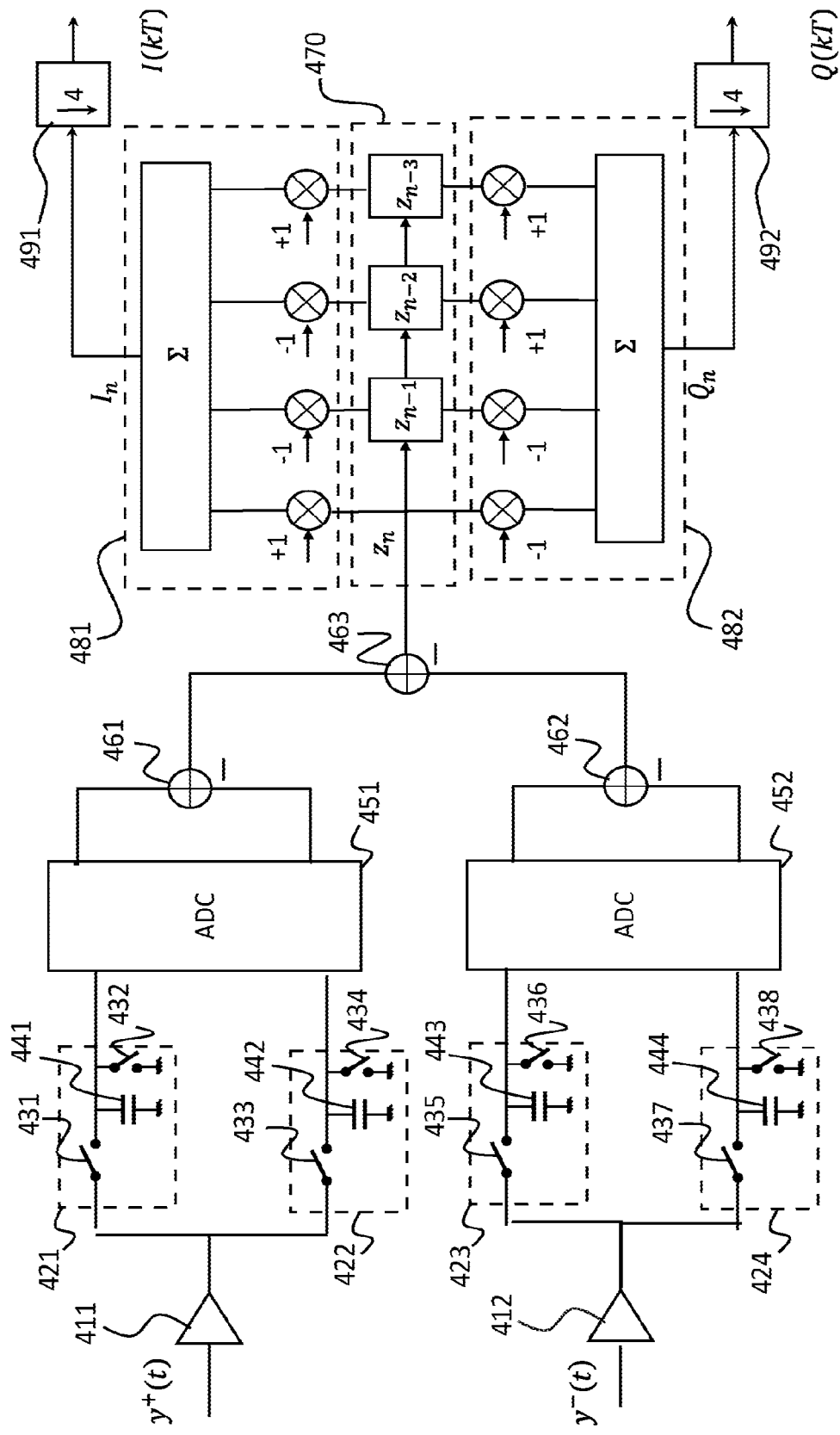
FIG. 4 schematically represents a second alternative of the quadrature demodulator for the receiver of FIG. 1.

FIG. 4 schematically represents a second alternative of a quadrature digital demodulator that can be used in the receiver of FIG. 1.

Unlike the first alternative, it is assumed that the input signal is obtained in a rectified form. More precisely, this has the form of a positive component, noted $y^+(t)$, and a negative component, noted $y^-(t)$, such that:

$$y(t) = y^+(t) - y^-(t) \tag{19}$$

The product w(t) can then be written as:

$$w(t) = y^+(t)g^+(t) - y^+(t)\bar{g}^+(t) - y^-(t)g^+(t) + y^-(t)\bar{g}^+(t) \tag{20}$$

The positive component of the received signal, $y^+(t)$, is amplified by an amplifier 411 and integrated in a first integrator 421 as well as in a second integrator 422, which are arranged in parallel. As previously, the amplifier 411 can be a transconductance amplifier.

The first integrator 421 comprises a first switch 431 controlled by the logic signal $g^+(t)$ and a second switch 432 controlled by the inverse logic signal $\bar{g}^+(t)$. When the first switch 431 is closed, the second switch 432 is open and the positive component $y^+(t)$ is integrated in the capacitor 441. Reversely, when the first switch 431 is open, the integration result is read and then the second switch 432 is closed to discharge the capacitor 441.

The second integrator 422 comprises a third switch 433 controlled by the logic signal $\bar{g}^+(t)$ and a fourth switch 434 controlled by the inverse logic signal $g^+(t)$. When the third switch 433 is closed, the fourth switch 434 is open and the positive component $y^+(t)$ is integrated in the capacitor 442. Reversely, when the third switch 433 is open, the integration result is read and then the fourth switch 434 is closed to discharge the capacitor 442.

Accordingly, it is understood that the first and second integrators provide the integration results of $y^+(t)g^+(t)$ and $y^+(t)\bar{g}^+(t)$ respectively on a duration $$\frac{T}{4}.$$

After a conversion by the converter 451, the integration result output from the second integrator is subtracted from the integration result output from the first integrator by means of a first summer 461.

In the same way, the negative component, $y^-(t)$, is amplified by an amplifier 412 and integrated in a third integrator 423 as well as in a fourth integrator 424, arranged in parallel. The amplifier 412 can be a transconductance amplifier.

The third integrator 423 comprises a fifth switch 435 controlled by the logic signal $g^+(t)$ and a sixth switch 436 controlled by the inverse logic signal $\bar{g}^+(t)$. When the fifth switch 435 is closed, the sixth switch 436 is open and the negative component $y^-(t)$ is integrated in the capacitor 443. Reversely, when the fifth switch 435 is open, the integration result is read and then the sixth switch 436 is closed to discharge the capacitor 443.

The fourth integrator 424 comprises a seventh switch 437 controlled by the logic signal $\bar{g}^+(t)$ and an eighth switch 438 controlled by the inverse logic signal $g^+(t)$. When the seventh switch 437 is closed, the eighth switch 438 is open and the negative component $y^-(t)$ is integrated in the capacitor 444. Reversely, when the seventh switch 437 is open, the integration result is read and then the eighth switch 438 is closed to discharge the capacitor 444.

Accordingly, it is understood that the third and fourth integrators provide the integration results of $y^-(t)g^+(t)$ and $y^-(t)\bar{g}^+(t)$ respectively on a duration $$\frac{T}{4}.$$

After a conversion by the analogue digital converter 452, the integration result output from the fourth integrator is subtracted from the integration result output from the third integrator by means of a second summer 462.

The result output from the second summer 462 is then subtracted from the result output from the first summer 461 by means of a third summer 463. It will be understood that the first, second and third summers could be replaced by a single summer performing the combination of the integration results based on expression (19). Likewise, in 451 and 452 are represented two ADC converters for each of the positive and negative components. However, it will be understood that an architecture with four ADC converters with half the frequency or a single with twice the frequency could be contemplated. Generally, the degree of mutualisation of the different components of the demodulator will result from a compromise between their number and their working frequency, in a known manner per se.

Anyway, the summation results, noted $z_n$ as previously, are stored in a buffer memory (for example a FIFO register) 470. At the point in time $t_n$, the FIFO register contains the previous values $z_{n-1}, z_{n-2}, z_{n-3}$. As in the first alternative, a first combining module 481 performs the combination:

$$I_n = z_n - z_{n-1} - z_{n-2} + z_{n-3} \tag{21-1}$$

and a second combining module 482 performs the combination:

$$Q_n = -z_n - z_{n-1} + z_{n-2} + z_{n-3} \quad (21\text{-}2)$$

The outputs from the first and second combining modules are decimated by a factor 4 in the decimators 491 and 492 respectively to give:

$$I(kT) = I_{4n} \quad (22\text{-}1)$$

$$Q(kT) = Q_{4n} \quad (22\text{-}2)$$

It is understood that this second alternative, as the first one, enables a quadrature demodulation to be performed without resorting to analogue mixers.

In the first as in the second alternative, it is important to know the re-sampling point in time (or decimation point in time) in the decimators 391, 392 and 491, 492. It is understood indeed that there are four decimation possibilities for the samples $I_n, Q_n$. The receiver does not know the way he has to time the decimation in the series of samples. Stated in an equivalent manner, the receiver does not know the sampling phase (phase of the carrier at the re-sampling point in time), called hereinafter sampling phase IQ.

To properly time the sampling phase IQ, the particular format of the VHBR transmission is advantageously taken to advantage, that is the fact that each frame is preceded by an interval during which the carrier is not modulated. This time interval is provided to enable the receiver to recover energy before beginning the demodulation.

If the receiver is equipped with a PLL, it is assumed that during this time interval, the phase locked loop (PLL) of the receiver has time enough to be locked in frequency on the received carrier. Alternatively, the receiver can be equipped with a reference tuned (quartz) to the carrier frequency.

Figure 6:
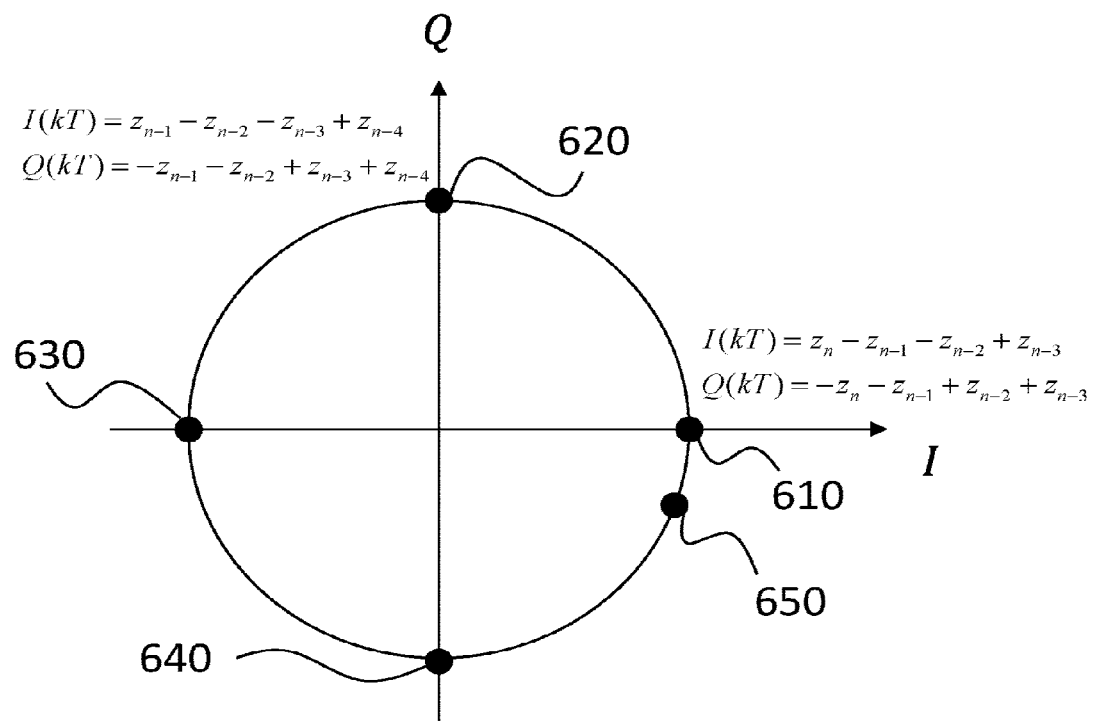
FIG. 6 schematically represents the different possible sampling phases of the decimators in the quadrature demodulators of FIG. 3 or 4.

In FIG. 6, on the unit circle, the four possible sampling phases IQ are represented.

In position 610, the sampling phase IQ is zero, in other words the sampling is properly timed with respect to the carrier. All the power from the demodulated signal is thus on the channel I with $I(kT)>0$ and the power on the channel Q is almost zero, in other words $Q(kT)=0$.

In position 620, the sampling phase IQ is $$\frac{\pi}{2},$$

that is the re-sampling point in time is $$\frac{T}{4}$$

ahead of time with respect to what it would be (offset by one sample in the buffer). All the power from the demodulated signal is on the channel Q with $Q(kT)>0$ and the power on the channel I is almost zero, in other words $I(kT)=0$.

In position 630, the sampling phase IQ is $\pi$, that is the re-sampling point in time is offset by $$\frac{T}{2}$$

with respect to what it would be (offset by 2 samples in the buffer). All the power from the demodulated signal is on the channel I with $I(kT)<0$ and the power on the channel Q is almost zero, in other words $Q(kT)=0$.

Finally, in position 640, the sampling phase IQ is $$-\frac{\pi}{2},$$

that is the re-sampling point in time is $$\frac{T}{4}$$

delayed with respect to what it would be (offset by 3 samples in the buffer).

If the sampling phase IQ is not in one of these four positions, for example if it is located in position 650, this means that the clock (provided by the PLL loop or by the frequency reference) is poorly tuned in phase and/or in frequency. The lock phase $g^+(t)$ (and $\overline{g}^+(t)$) can then be corrected such that the sampling phase is in one of the four previous positions.

The timing of sampling IQ is performed by calculating the powers received on the channels I and Q for one or more sampling phases.

If the calculation is performed for a single phase at the same time, the sampling phases IQ are successively scanned until the sampling phase IQ which gives $I(kT)>0$ and $Q(kT)=0$ is found. In practice, it is sufficient to test in parallel two neighbouring phases and to identify the one for which $Q(kT)=0$. If $I(kT)>0$, the sampling phase IQ is zero and thus the timing of the decimators is proper. On the other hand, if $I(kT)<0$, the sampling phase IQ is $\pi$ and it is sufficient to offset the sampling of the decimators by two samples.

To obtain a quicker sampling timing, the powers on the channels I and Q could be calculated for at least two sampling phases. Advantageously, two neighbouring sampling phases in parallel will be tested. Thus, which is the one for which $Q(kT)=0$ will be determined and from the sign of the samples $I(kT)$ obtained for this phase, it is decided whether the decimator is well synchronized ($I(kT)>0$) or if the decimation should be offset by two samples ($I(kT)<0$).

In practice, the decision is not taken on a single sample by sampling phase IQ thus tested but on an average of such samples by sampling phase IQ, so as to remove noise. This average can be calculated by accumulation on a predetermined number of samples or by a low-pass filtering (for example a recursive low-pass filtering) in a known manner per se.

Optionally, the value of the calculated average can also be used to facilitate synchronization of the clock of the PLL, when this is present, with respect to the carrier (for example, the sampling phase IQ in 650 gives an indication of the clock offset with respect to the carrier).

Figure 7:
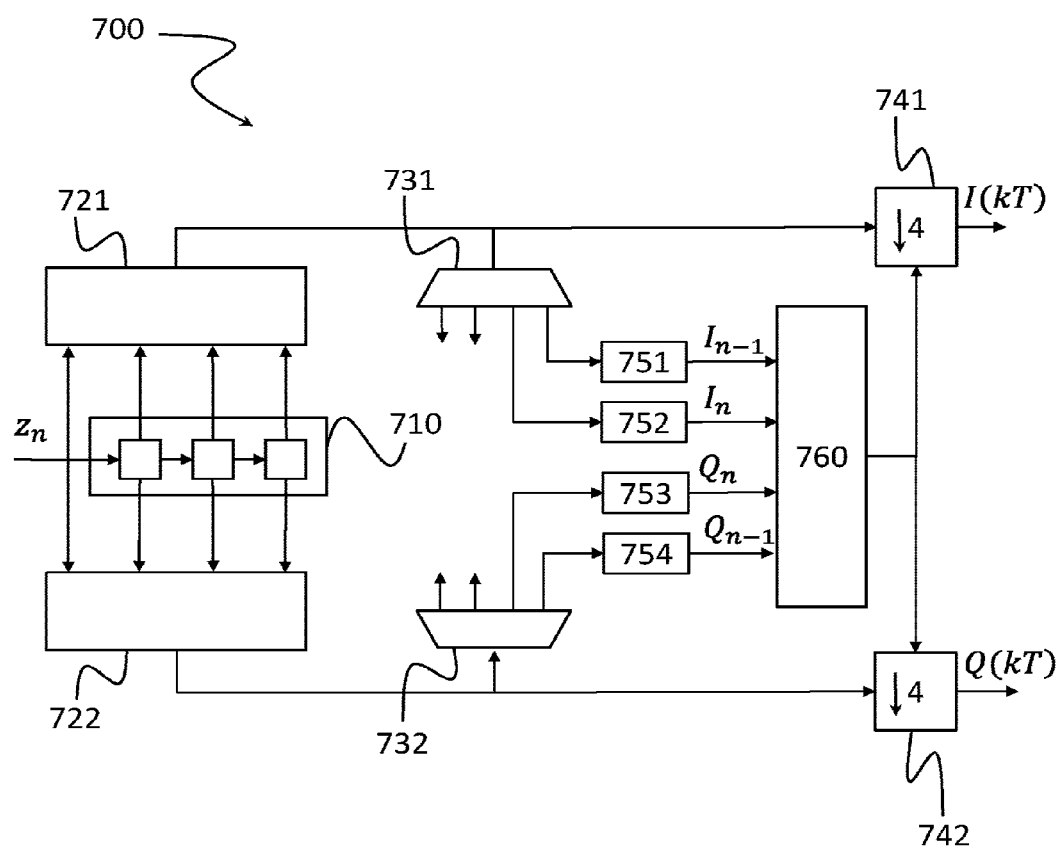
FIG. 7 schematically represents a quadrature demodulator according to FIG. 3 or 4 with a synchronization of the sampling I/Q.

FIG. 7 schematically represents a quadrature demodulator 700 with synchronization of the sampling of the channels I and Q (also called synchronization IQ).

710 designates the FIFO register containing the samples $z_n$ as well as 721 and 722 designate the combining modules related to the channels I and Q. It will be understood that the FIFO register 710 corresponds to the buffer memory 370 of FIG. 3 or to the buffer memory 470 of FIG. 4. The combining modules 721 and 722 correspond to the combining modules 381 and 382 of FIG. 3 or to the combining modules 481 and 482 of FIG. 4. Finally, the decimators 741 and 742 represent the decimators 391 and 392 of FIG. 3 or the decimators 491 and 492 of FIG. 4.

The samples $I_n$ output from the combining module 721 are transmitted on the one hand to a second multiplexer (1 to 4) with four outputs, 731, and on the other hand to a decimator, 741, with a decimation factor 4. The second demultiplexer 531 can for example be made by means of a series/parallel converter forming words with four successive samples.

In the example illustrated, two outputs of the demultiplexer are respectively connected to accumulators 751 and 752 making a moving average on a predetermined number of samples. This number is chosen such that the accumulation duration is lower than the duration of the interval preceding the transmission frame. Thus, the received signal is actually a carrier which is not modulated during the accumulation time. The two outputs are here chosen contiguous, in other words the tested sampling phases IQ are neighbours (in quadrature). The averages from the accumulators for these two sampling phases IQ are provided to a second decision module 760.

In a similar way, the samples $Q_n$ output from the combining module 722 are transmitted on the one hand to a third demultiplexer with four outputs, 732, and on the other hand to a decimator, 742, with a decimation factor 4. Once again, the third demultiplexer 132 can be for example made by means of a series/parallel converter forming words with four successive samples.

As for the channel I, two output terminals of the third demultiplexer are respectively connected to accumulators 753 and 754, these accumulators making a moving average on said predetermined number of samples. Both outputs of the demultiplexer 732 are the same as those of the demultiplexer 731. The averages from both these accumulators are also provided to the second decision module 760.

Thus, the second decision module has the samples $I_n, Q_n$ and $I_{n-1}, Q_{n-1}$. The second decision module determines which of $Q_n$ and $Q_{n-1}$ is lower in absolute value than a threshold, and then for this one, determines the sign of the corresponding quadrature sample $sgn(I_n)$ or $sgn(I_{n-1})$. From this information, the second decision module 760 determines the decimation point in time corresponding to the zero sampling phase.

The second decision module 760 controls the point in time of the sampling IQ (decimation point in time) in the decimators 741 and 742. The samples obtained by decimation are thus those corresponding to the zero sampling phase IQ.

After synchronization of the sampling IQ, the samples Q(kT) of the quadrature channel are of an almost zero power during the interval preceding the transmission frame. On the other hand, during the transmission frame, the carrier is modulated, and the samples of the quadrature channel of course bear a phase information about the transmitted symbols.

The quadrature symbols I(kT) and Q(kT) are then provided to the symbol synchronisation module 120 and demodulated by the PSK demodulator 130 as previously described Those skilled in the art will understand that the first and second demultiplexers, the accumulators as well as the second decision module could be implemented according to different alternatives without departing from the scope of the present invention. In particular, some calculations made in parallel by the accumulators could be made in series within a single accumulator operating at a higher frequency.

The invention claimed is:

1. A RFID receiver for receiving a signal comprising transmission frames, each frame consisting of PSK symbols and beginning with a sequence of a,a,a*,a*,a,a, ... type pilot symbols, the signal being modulated at a carrier frequency f=1/T, the receiver comprising a quadrature digital demodulator for providing, at a sampling frequency $f_e$=4f, in-phase samples and quadrature samples to a symbol synchronization module, a PSK demodulator for demodulating PSK symbols provided by the symbol synchronization module, said receiver comprising:

a first demultiplexer receiving a sequence formed by the consecutive quadrature samples for providing four interleaved subsequences of these samples, each subsequence consisting of one sample out of four of said sequence of samples;

a sign detector receiving the samples of one of these subsequences and providing a sign signal;

a sign correlator for correlating the sign signal thus obtained with a signed sequence having a predetermined length;

correlation means for correlating the different subsequences with said signed sequence respectively;

a first decision module activated when the correlation result of the sign correlator exceeds a predetermined threshold, the decision module determining, when activated, the subsequence providing the highest correlation result and deducing a decimation point in time therefrom;

at least one first and one second decimator receiving respectively, at the sampling frequency, the in-phase and quadrature samples of the quadrature digital demodulator, and decimating them at said decimation point in time for providing in-phase and quadrature components of the modulation symbols at the baud rate.

2. The RFID receiver according to claim 1, wherein the first demultiplexer is made by means of a series/parallel converter forming words of four successive samples, one of the outputs of said converter being connected to the sign correlator.

3. The RFID receiver according to claim 1, wherein the sign detector provides a value equal to −1 when an input sample is lower than a predetermined negative threshold value, a value equal to +1 when the input sample is higher than a predetermined positive threshold value, and a zero value when the input sample is between said negative threshold value and said positive threshold value.

4. The RFID receiver according to claim 1, wherein it generates a square logic signal ($g^+(t)$) at the frequency 2f and a second square logic signal ($g^-(t)$) being the inverse of the first one, the quadrature digital demodulator comprising:

a first integrator for integrating a first component of the received signal ($y(t), y^+(t)$) when the first logic signal is in a high state and providing a first integration result when the first logic signal is in a low state;

a second integrator for integrating said component of the received signal ($y(t), y^+(t)$) when the second logic signal is in a high state and providing a second integration result when the second logic signal is in a low state;

a first subtractor for subtracting the second integration result from the first integration result for providing samples $z_n$ at the frequency 4f;

a first combining module for combining successive samples $z_n, z_{n-1}, z_{n-2}, z_{n-3}$ and providing the samples $I_n = z_n - z_{n-1} - z_{n-2} + z_{n-3}$ at the frequency 4f;

a second combining module for combining successive samples $z_n$, $z_{n-1}$, $z_{n-2}$, $z_{n-3}$ and providing samples $Q_n = -z_n - z_{n-1} + z_{n-2} + z_{n-3}$ at the frequency 4f;

a third decimator for decimating the samples $I_n$ with a decimation factor 4 for providing in-phase component samples I(kT);

a fourth decimator for decimating the samples $Q_n$ with a decimation factor 4 for providing quadrature component samples Q(kT).

5. The RFID receiver according to claim 4, wherein said first component of the received signal is the received signal itself.

6. The RFID receiver according to claim 4, wherein the first component ($y^+(t)$) corresponds to the positive part of the received signal, a second component ($y^-(t)$) corresponds to the negative part of the received signal, the received signal being a combination of the first component and the second component, and in that the quadrature digital demodulator further comprises:

a third integrator for integrating the second component of the received signal when the first logic signal is in a high state and providing a third integration result when the first logic signal is in a low state;

a fourth integrator for integrating the second component of the received signal when the second logic signal is in the high state and providing a fourth integration result when the second logic signal is in the low state;

a second subtractor for subtracting the fourth integration result from the third integration result, the samples $z_n$ being obtained as a combination of the results of the first and second subtractors.

7. The RFID receiver according to claim 5, wherein the quadrature digital demodulator comprises a first analogue-digital converter for converting the first and second integration results before the subtraction by the first subtractor.

8. The RFID receiver according to claim 6, wherein a first analogue/digital converter for converting the first and second integration results before the subtraction by the first subtractor as well as a second analogue/digital converter for converting the third and fourth integration results before the subtraction by the second subtractor.

9. The RFID receiver according to claim 4, wherein the quadrature digital demodulator comprises a second demultiplexer receiving the samples $I_n$ and demultiplexing them to four outputs, a third demultiplexer receiving the samples $Q_n$ and demultiplexing them to four outputs, the quadrature digital demodulator further comprising a second decision module receiving at least one sample from an output of the demultiplexer and at least one sample of a corresponding output of the third demultiplexer, said second decision module deciding, for a time interval when said carrier is not modulated, the decimation point in time in the third and fourth decimators.

10. The RFID receiver according to claim 9, wherein the second decision module receives two consecutive samples $I_n, I_{n-1}$ of two neighbouring outputs of the second demultiplexer and two consecutive samples $Q_n, Q_{n-1}$ of two neighbouring outputs of the third demultiplexer, the second decision module deciding the decimation point in time in the third and fourth decimators by comparing in absolute value $I_n$ and $I_{n-1}$ with a predetermined threshold and if the sample $I_n$, resp. $I_{n-1}$, is lower than this threshold by determining the sign of the corresponding sample $Q_n$, resp. $Q_{n-1}$.

11. The RFID receiver according to claim 9, wherein the second decision module receives two consecutive samples $I_n, I_{n-1}$ from two neighbouring outputs of the second demultiplexer and two consecutive samples $Q_n, Q_{n-1}$ from two neighbouring outputs of the third demultiplexer, the second decision module deciding the decimation point in time by comparing in absolute value $Q_n$ and $Q_{n-1}$ with a predetermined threshold and if the sample $Q_n$, resp. $Q_{n-1}$ is lower than this threshold, by determining the sign of the corresponding sample $I_n$, resp. $I_{n-1}$.

12. The RFID receiver according to claim 10, wherein the samples of each of both neighbouring outputs of the second and third demultiplexers are filtered by low-pass filters before being provided to the second decision module.

* * * * *